Patented July 1, 1941

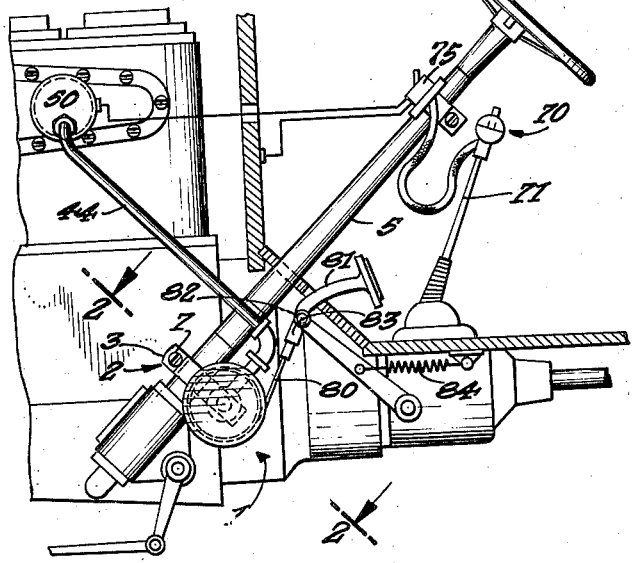
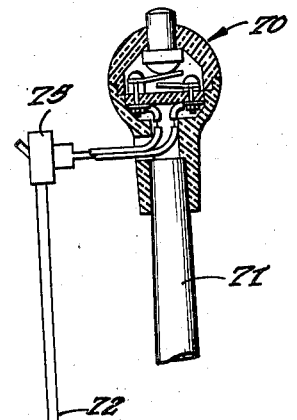
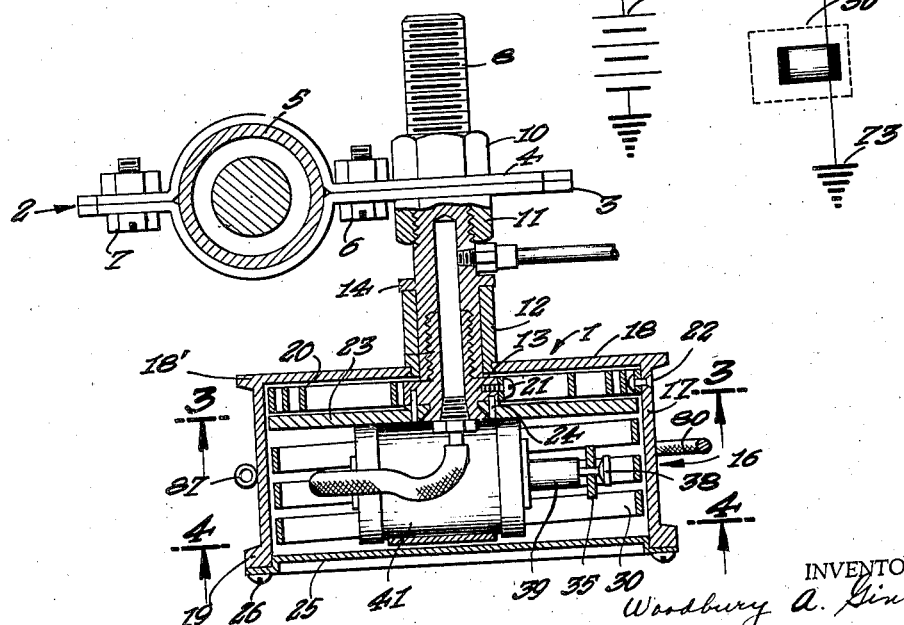

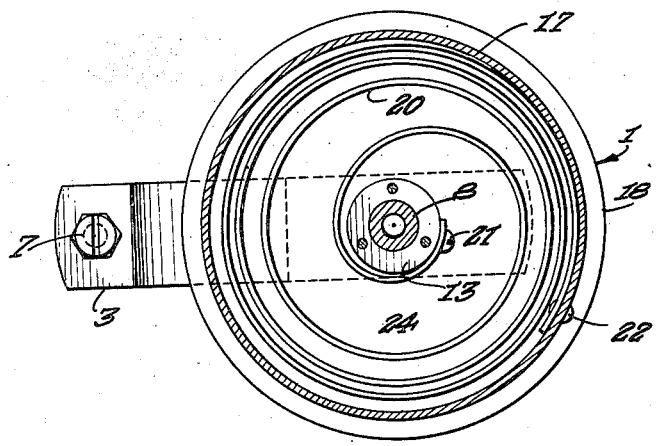
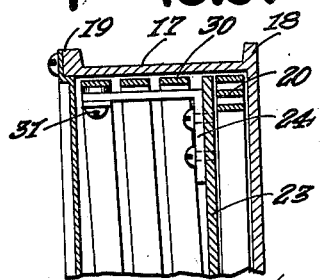
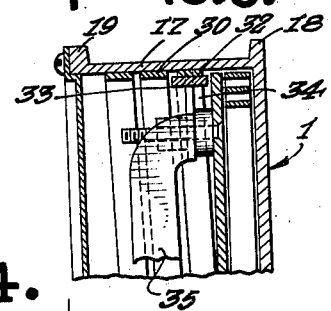
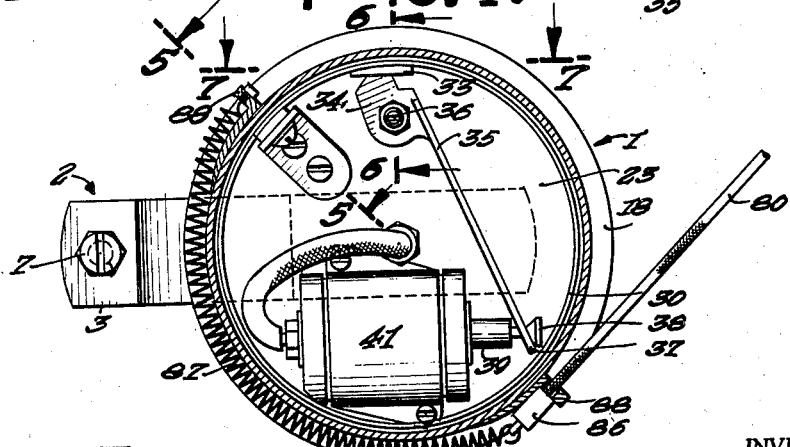
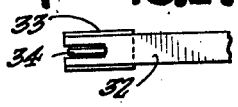

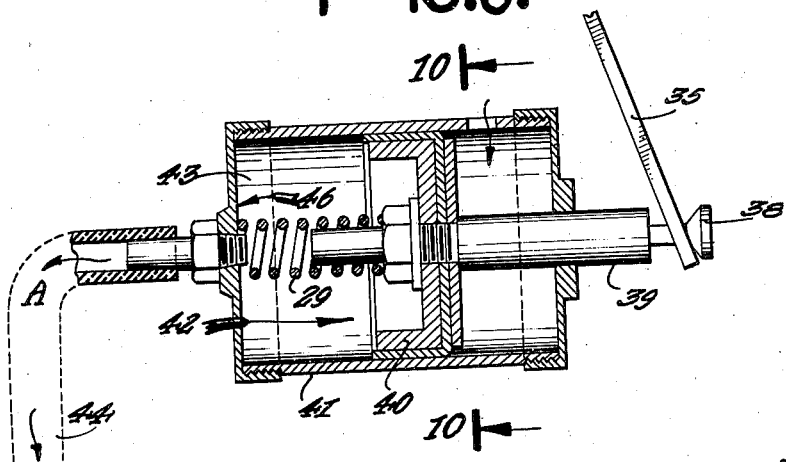
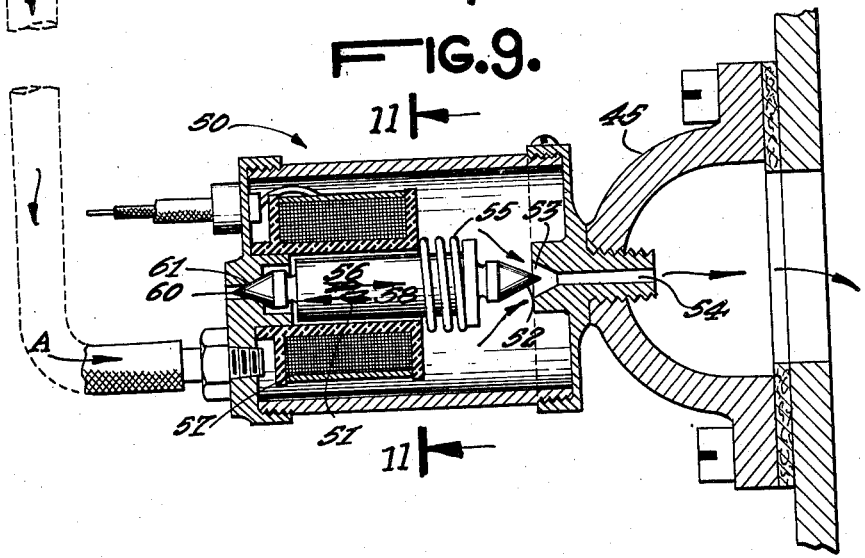
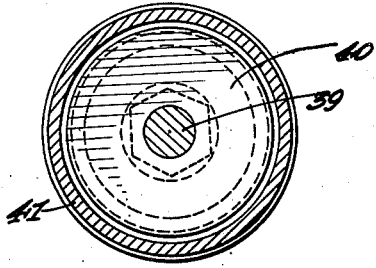
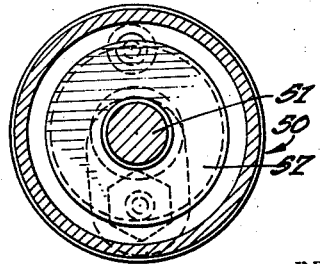

2,247,369

UNITED STATES PATENT OFFICE 2,247,369

BRAKE CONTROL FOR AUTOMOTIVE VEHICLES

Woodbury A. Gindele, New Rochelle, N. Y.

Application November 28, 1940, Serial No. 367,547

6 Claims. (Cl. 188—265)

The nature of the invention is a brake lock for automotive vehicles to enable the operator to freeze the braking action whenever desired by the manual operation of a switch or bush button. The object of my invention is to provide a device of this nature that is compact, rugged, inexpensively constructed, easily installed, and convenient and efficient in operation.

The invention will be fully understood from the following description, read in conjunction with the drawings in which—

Fig. 1 is a vertical section through part of an automobile showing the apparatus installed;

Fig. 1a is a wiring diagram of the electrical circuit involved;

Fig. 2 is a section through the apparatus on the plane indicated by 2—2 in Fig. 1;

Fig. 3 is a section through the construction shown in Fig. 2 on the plane indicated by 3—3;

Fig. 4 is a section through the construction shown in Fig. 2 on the plane indicated by 4—4;

Fig. 5 is a radial section through the construction shown in Fig. 4 on the plane indicated by 5—5;

Fig. 6 is a radial section through the construction shown in Fig. 4 on the plane indicated by 6—6;

Fig. 7 is a section through the construction shown in Fig. 4 on the plane indicated by 7—7;

Fig. 8 is a longitudinal section through part of the construction shown in Figs. 2 and 4;

Fig. 9 is a longitudinal section through a part of the apparatus of my invention;

Fig. 10 is a section through the construction shown in Fig. 8 on the plane indicated by 10—10; and Fig. 11 is a section through the construction shown in Fig. 9 on the plane indicated by 11—11.

Referring to Fig. 2, the device 1 is supported by clamp 2 composed of members 3 and 4 secured to steering column 5 by bolts 6 and 7. Clamp 2 carries shaft 8 which passes through mating holes in the members 3 and 4 and is rigidly held in position with respect to the clamp by nuts 10 and 11.

By removing nut 10 and the bolts 6 and 7, clamp 2 may be separated into its members and then made up in the assembly shown, firmly and rigidly attached to steering column 5 of an automotive vehicle. This step of the installation of the device can be completed within a period of a few minutes, and as will be hereinafter developed, the remaining few steps involved in the installation of the device can be similarly completed in correspondingly brief intervals of time.

Referring again to Fig. 2, shaft 8 carries rotatably mounted, i. e., journaled thereon, bushing 12 held longitudinally in position by bolt 13 threaded into shaft 8 and annular projecting flange 14 integral with shaft 8. Bushing 12 carries drum 16 composed of tubular portion 17 and end 18. Drum 16 carries means for winding up a flexible connector, which means may, for example, be a pulley surrounding and concentric with bushing 12 but is preferably formed by the outside surface of tubular portion 17. For this purpose 17 may be provided (Fig. 4) with annular projecting flanges 18′ and 19, supplemented in either case by means at the winding surface of 17 for holding one end of the flexible connector.

The free rotation of drum 16 with respect to shaft 8 is prevented by spiral winding spring 20, one end of which is anchored by screw 21, projecting into the bolt 13, while the other end is secured to tubular member 17 of drum 16 by rivet 22. The drum 16 may be turned against the increasing tension of spring 20 but when released, will be returned to its original position by the tendency of spring 20 to unwind. The relative arrangement of shaft 8, bolt 13, winding spring 20, and tubular wall 17 appear in end view in Fig. 3. Bolt 13 (Fig. 2) carries anchor plate 23 rigidly secured in position by pins 24 projecting into bolt 13, thereby immobilizing plate 23 with respect to bolt 13 and shaft 8. Within the space defined by plate 23 and the inner surface of 17, is located brake band 30 which in this case takes the form of a spirally wound strip of spring metal which, when expanded, contacts the inner surface of 17. One end of 30 (Fig. 5) is secured by pin 31 to bracket 24 secured to plate 23 and is thereby held in fixed position with respect to plate 23. The other end 32 of brake band 30 is provided with a forked abutment 33 which straddles tooth 34 (Figs. 4, 6 and 7) formed on the end of lever 35. This lever is pivotally mounted on anchor plate 23 (Fig. 4) by pin 36. The lower end 37 of lever 35 straddles knob 38 formed on the end of plunger 39.

Plunger 39 (Fig. 8) is attached to piston 40, longitudinally slidable in cylinder 41. Normally the piston and plunger are urged by spring 29 in the direction indicated by arrow 42, thereby releasing brake band 30. Space 43, however, communicates through duct 44 with the intake manifold 45 (Fig. 9) of the internal combustion engine with which the automotive vehicle is provided to the end that the partial vacuum existing in the intake manifold may be controllably applied to the space 43, thereby drawing piston 40 and plunger 39 in the direction indicated by arrow 46 (Fig. 8) and thereby through the operation of lever 35 expanding and applying brake band 30 and freezing the rotation of drum 16. This action is subject to the control of the operator of the vehicle and for this purpose flow through duct 44 to intake manifold 45 is controlled by magnetic valve 50 (Fig. 9). This valve includes the plunger 51 carrying conical plug 52 which seats in frusto-conical surface 53 thereby controlling flow through duct 54 directly into manifold 45. Plunger 51 is normally urged by spring 55 in the direction indicated by arrow 56, thereby blocking flow through duct 44 into manifold 45. When coil 57 is energized, plunger 51 is moved in the direction indicated by arrow 58, thereby placing intake manifold 45 in free communication with duct 44, moving plunger 39 (Fig. 8) in the direction indicated by arrow 46 and through the application of brake band 30, freezing the rotation of drum 17. As soon as the current is discontinued, plug 52 returns to valve seat 53, thereby blocking further communication and releasing brake band 30 and drum 17. When plunger 51 returns in this manner, plug 60 (Fig. 9) leaves seat 61, thereby breaking any vacuum that may exist in duct 44. The electrical circuit involved is illustrated in Fig. 1a in which 70 is a push button mounted on one end of gear shift lever 71. Alternatively, any type of switch may be employed, provided it is mounted within easy reach of the operator of the vehicle. When the circuit is completed by the application of the push button or switch, current flows through the lead 72 through the magnetic valve 50 to ground 73. Current for this purpose may be supplied by storage battery 74 with which the vehicle is ordinarily equipped and preferably is taken off subsequent to ignition switch 75. This insures that the device will not be accidentally left on when the vehicle is not in use if a switch is used instead of the push button 70.

The flexible connector 80 (Fig. 4) is secured to the outer surface of tubular member 17, and this flexible connector is in turn secured to foot pedal 81 with which the vehicle is equipped. Whenever the foot pedal is depressed, flexible connector 80 is wound upon drum 17 by the action of the winding spring 20 and whenever the pressure is released, the foot pedal 81 returns to its usual position with the concomitant unwinding of flexible connector 80. If, however, it is desired for any reason to freeze the braking action, push button 70 is operated, whereupon the vacuum of the intake manifold is applied by magnetic valve 50 to plunger 39, thereby applying brake band 30 and freezing drum 17. Foot pedal 81 is thereby immobilized in the applied position and so remains until the electrical circuit is broken. This may be the case, for example, where the car is stopped on an upgrade and it is desired to prevent the vehicle from rolling backward in the interval required to transfer the foot of the driver to the accelerator pedal and to build up the requisite engine speed. It also provides an easy and convenient means of freezing the braking action and releasing the brake foot whenever the vehicle is temporarily stopped.

Drum 16 (Fig. 2) is provided with cover 25 secured to flange 19 by screws 26 to exclude dust and dirt from the interior of the drum.

When the device is installed, foot pedal 81 is drilled to receive pin 82 and flexible connector 80 is connected through yoke 83 to this pin. Alternatively, the free end of the flexible connector may be merely carried as a loop around the elbow of the foot pedal and secured in position by a cable clamp. The control device is then placed in appropriate position with respect to steering column 5 by the use of clamp 2 as hereinbefore described. Flexible connector 80 is so wound upon drum 16 that it is wound upon the drum by the operation, i. e., the unwinding of spring 20 while the unwinding of the flexible connector from the drum rewinds and charges spring 20. When the device is installed, spring 20 is sufficiently wound to take up any slack in the flexible connector released by the application of the foot pedal 81 and in consequence whenever the foot pedal is depressed, the winding spring 20 rotates drum 17, thereby winding part of the flexible connector upon the drum. The force of the winding spring 20 is insufficient to overcome the tractive force of spring 84 (Fig. 1) with which the foot pedal is provided and the foot pedal is, therefore, free to return to the position shown in Fig. 1 simultaneously unwinding flexible connector 80 and winding up spring 20. It is, therefore, evident that in the normal operation of the device the flexible connector will at all times be maintained under a substantially uniform tension. The exception to this occurs in the case where the operator of the vehicle has accidentally applied push button 70 or the equivalent circuit closing device before the foot pedal is depressed and in this case the drum, being immobilized, could not operate to take up the slack in flexible connector 80. I have, however, safeguarded against this contingency by incorporating means for taking up any slack in the flexible connector 80 even though the drum 17 is temporarily accidentally immobilized. The drum end 86 of flexible connector 80 is for this purpose connected to the spiral tension spring 87. One end of this spring is anchored to drum 17 by flange 88 and if the foot pedal is depressed while the drum is immobilized, spring 87 contracts, thereby drawing the drum end of the flexible connector into the position now occupied by the spring and automatically preventing the development of any slack in the flexible connector. The spring 87 is only permitted to elongate to the extent necessary to accomplish this purpose, and for this reason its extension is restricted by stop 88 secured to the outer surface of drum 17.

The foregoing description is furnished by way of illustration and not of limitation, and it is, therefore, my intention that the invention be limited only by the appended claims or their equivalents wherein I have attempted to claim broadly all inherent novelty.

I claim:

1. In an automotive vehicle actuated by an internal combustion engine having an intake manifold and including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon said winding means and having its free end connected to said foot pedal, a brake adapted when applied to arrest rotation of said drum, a vacuum operated plunger adapted to apply said brake, a duct operatively connecting said plunger with the intake manifold, a valve controlling flow in said duct and means adjacent the driving position controlling said valve.

2. In an automotive vehicle actuated by an internal combustion engine having an intake manifold and including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon said winding means and having its free end connected to said foot pedal, a brake adapted when applied to arrest rotation of said drum, a vacuum operated plunger adapted to apply said brake, a duct operatively connecting said plunger with the intake manifold, a magnetic valve controlling flow in said duct and associated circuit and means for completing said circuit adjacent the driving position.

3. In an automotive vehicle actuated by an internal combustion engine having an intake manifold and including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon said winding means and having its free end connected to said foot pedal, a spirally wound brake bearing against the inner surface of said drum adapted when applied to arrest rotation of said drum, a vacuum operated plunger adapted to apply said brake, a duct operatively connecting said plunger with the intake manifold, a valve controlling flow in said duct and means adjacent the driving position controlling said valve.

4. In an automotive vehicle actuated by an internal combustion engine having an intake manifold and including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon said winding means and having its free end connected to said foot pedal, a spirally wound brake bearing against the inner surface of said drum adapted when applied to arrest rotation of said drum, a vacuum operated plunger adapted to apply said brake, a duct operatively connecting said plunger with the intake manifold, a magnetic valve controlling flow in said duct and associated circuit and means for completing said circuit adjacent the driving position.

5. In an automotive vehicle including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon the said winding means and having its free end connected to said foot pedal, a brake adapted when applied to arrest rotation of said drum, means adjacent the driving position controlling the application of said brake, and means for taking up slack in said flexible connector.

6. In an automotive vehicle including braking means and a foot pedal controlling said braking means, a shaft, means for securing said shaft in fixed attachment to said automotive vehicle, a drum journaled on said shaft, a winding spring between said drum and said shaft, means for winding a flexible connector carried by said drum, a flexible connector adapted to be wound in part upon the said winding means and having its free end connected to said foot pedal, a brake adapted when applied to arrest rotation of said drum, means adjacent the driving position controlling the application of said brake, a spring connected to said flexible connector adapted to take up slack therein and a stop limiting the extension of said spring.

WOODBURY A. GINDELE.